United States Patent [19]
Barkans et al.

[11] Patent Number: 4,888,712
[45] Date of Patent: Dec. 19, 1989

[54] GUARDBAND CLIPPING METHOD AND APPARATUS FOR 3-D GRAPHICS DISPLAY SYSTEM

[75] Inventors: Anthony C. Barkans, Billerica; Brian D. Schroeder, Lowell; Thomas L. Durant, Billerica; Dorothy Gordon, Somerville; Jorge Lach, Burlington, all of Mass.

[73] Assignee: Schlumberger Systems, Inc., Sunnyvale, Calif.

[21] Appl. No.: 117,112
[22] Filed: Nov. 4, 1987
[51] Int. Cl.⁴ .......................... G06F 3/14; G06F 15/72
[52] U.S. Cl. .................................... 364/522; 340/723; 340/729; 364/521
[58] Field of Search ...................... 364/518, 521, 522; 340/729, 731, 734, 723; 382/44–48

[56] References Cited

U.S. PATENT DOCUMENTS

| | | | |
|---|---|---|---|
| 3,684,876 | 8/1972 | Sutherland | 364/700 |
| 3,732,557 | 5/1973 | Evans et al. | 340/710 |
| 3,763,365 | 10/1973 | Seitz | 364/754 |
| 3,816,726 | 6/1974 | Sutherland et al. | 382/41 |
| 3,889,107 | 6/1975 | Sutherland | 382/41 |
| 4,283,765 | 8/1981 | Rieger | 364/521 |
| 4,291,380 | 9/1981 | Rohner | 364/522 |
| 4,343,037 | 8/1982 | Bolton | 364/521 |
| 4,371,872 | 2/1983 | Rossman | 340/72 |
| 4,380,046 | 4/1983 | Fung | 364/200 |
| 4,412,296 | 10/1983 | Taylor | 364/521 |
| 4,458,330 | 7/1984 | Imsand et al. | 364/900 |
| 4,492,956 | 1/1985 | Collmeyer et al. | 340/723 |
| 4,550,315 | 10/1985 | Bass et al. | 340/703 |
| 4,570,181 | 2/1986 | Yamamura | 382/48 |
| 4,570,233 | 2/1986 | Yan et al. | 364/522 |
| 4,586,038 | 4/1986 | Sims et al. | 340/729 |
| 4,646,075 | 2/1987 | Andrews et al. | 340/747 |
| 4,658,247 | 4/1987 | Gharachorloo | 340/747 |
| 4,697,178 | 9/1987 | Heckel | 340/729 |
| 4,698,779 | 10/1987 | Holden et al. | 364/522 X |
| 4,709,231 | 11/1987 | Sakaibara et al. | 340/729 |
| 4,730,261 | 3/1988 | Smith | 364/521 |
| 4,736,200 | 5/1988 | Oununma | 340/734 |
| 4,737,921 | 4/1988 | Goldwasser et al. | 364/518 |
| 4,821,210 | 4/1989 | Rumbaugh | 364/522 X |

FOREIGN PATENT DOCUMENTS

| | | |
|---|---|---|
| 0137233A2 | 8/1984 | European Pat. Off. |
| 0167165A2 | 7/1985 | European Pat. Off. |
| 84/01153 | 7/1984 | PCT Int'l Appl. |
| 84/01705 | 10/1984 | PCT Int'l Appl. |

OTHER PUBLICATIONS

"High Speed Image Rasterization Using Scan Line Access Memories", Demetrescu, 1985 Chapel Hill Conference on Very Large Scale Integration 35 (H. Fuchs ed, 1985).

"Super Buffer: A Systolic VLSI Graphics Engine for Real Time Raster Image Generation", Gharachorloo & Pottle, 1985 Chapel Hill Conference on Very Large Scale Integration 35 (H. Fuchs ed, 1985).

"Pixel-Planes: Building a VLSI-Based Graphics System", Foulton et al., 1985 Chapel Hill Conference on Very Large Scale Integration 35 (H. Fuchs ed, 1985).

"Reentrant Polygon Clipping", Sutherland & Hodgman, Communications of the ACM, Jan., 1974, Vol. 17.

"An Analysis and Algorithm for Polygon Clipping", Liang & Barsky, Research Contributions, Robert Haralick, Editor, 1983 ACM.

"A VLSI Approach to Computer Image Generation", Cohen & Demetrescu, presented at the First Interservice/Industry Training Equipment Conference, Orlando, Fla., Nov. 28, 1979.

Copy of a printout of abstracts found in a state of the art search performed by independent searcher, Saul W. Chakin, Sep. 25, 1986.

Primary Examiner—Gary V. Harkcom
Assistant Examiner—H. R. Herndon
Attorney, Agent, or Firm—David H. Carroll; Robert C. Colwell; Paul C. Haughey

[57] ABSTRACT

A system for clipping polygons representing three-dimensional objects to produce a representation of the portion of the objects in a desired viewing space is disclosed. A guardband space at least partially enclosing the viewing space is defined. The polygons are compared to the guardband space to determine which polygons intersect at least one of the guardband planes defining the guardband space. The intersecting polygons are also compared to the viewing space to determine if they intersect at least one of the viewing planes defining the viewing space. Only polygons intersecting both a viewing plane and a guardband plane are clipped.

19 Claims, 4 Drawing Sheets

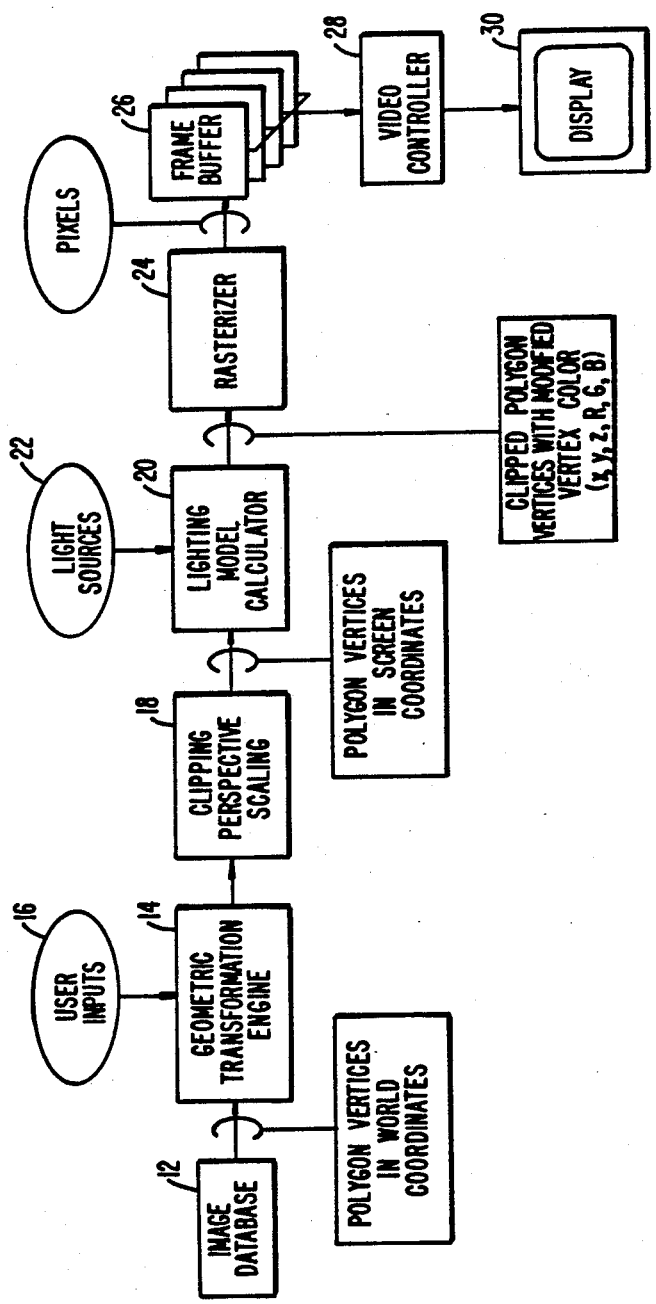
FIG._1. PRIOR ART

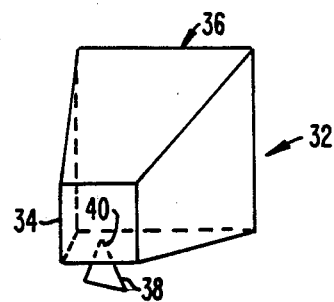
FIG._2. PRIOR ART
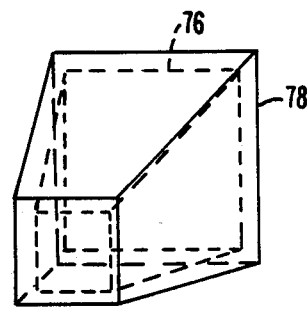
FIG._4.
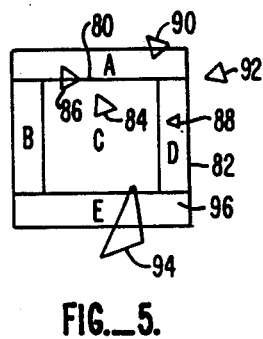
FIG._5.

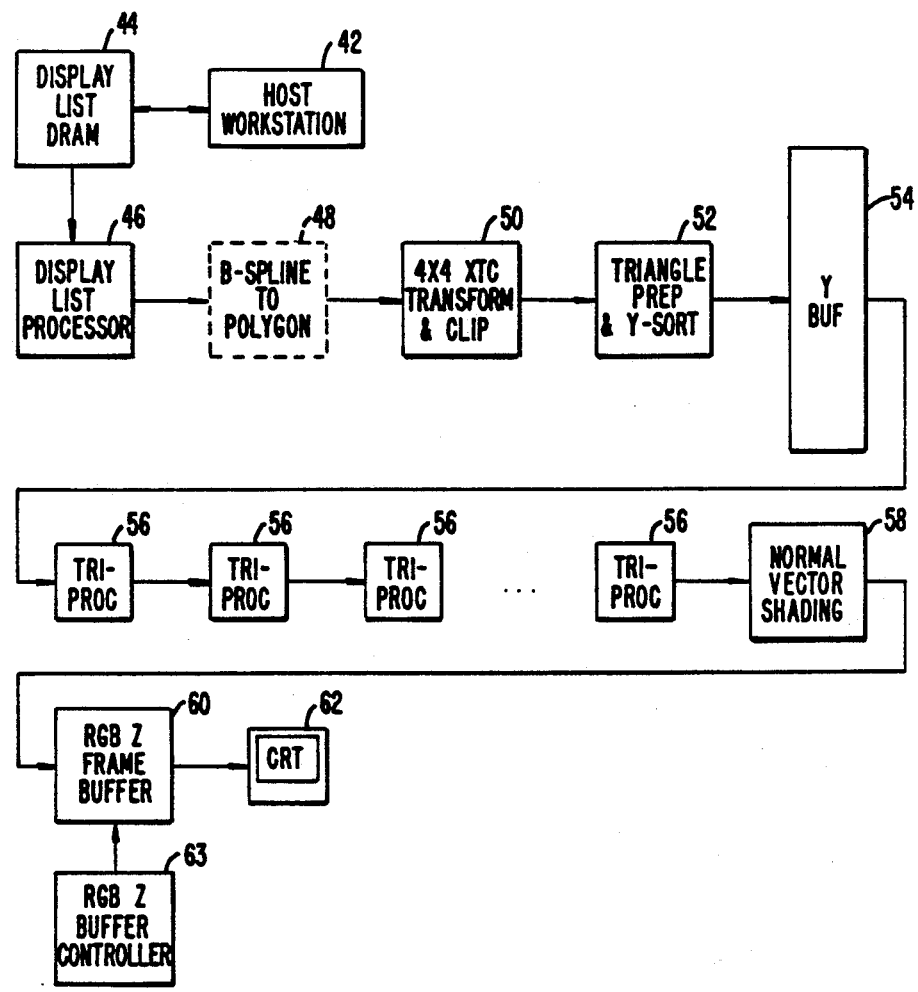
FIG._3.

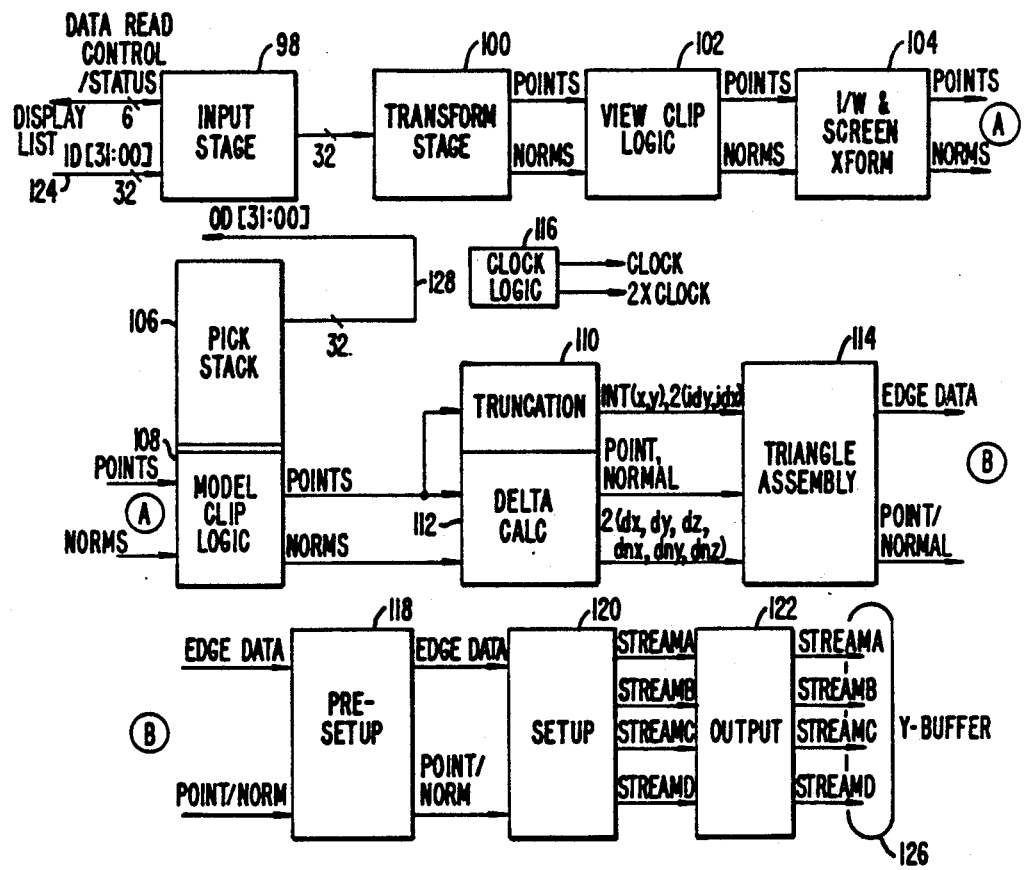
FIG._6.

GUARDBAND CLIPPING METHOD AND APPARATUS FOR 3-D GRAPHICS DISPLAY SYSTEM

BACKGROUND

The present invention relates to methods and apparatus for clipping polygons against a viewing volume for a 3-D graphics display system.

Three-dimensional computer graphics displays are used to display images to a user as if he were observing a real world environment. These systems store in a data base a representation in three dimensional coordinates of three-dimensional objects, as well as their color and other properties. Additional "environment" information including the number, color, location, and other properties of illumination sources, atmospheric properties, and many other details may also be specified. The display is produced after being provided with the desired viewing angle for the viewer. The system must calculate all the details of the image, including determining which objects obscure others from the viewer's point of view, and present them accordingly.

A typical graphics display system is shown in FIG. 1. An image data base 12 stores a description of the objects in the scene. The objects are described with a number of small polygons which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadralaterals, and the latter can always be decomposed into pairs of triangles.

A transformation engine 14 transforms the object coordinates in response to the angle of viewing selected by a user from user input 16. In addition, the user may specify the field of view, the size of the image to be produced, and the back end of the viewing volume so as to include or eliminate background as desired.

Once this viewing area has been selected, a clipping circuit 18 eliminates the polygons (i.e., triangles) which are outside the viewing area and "clips" the polygons which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model 20 is next applied taking into account the light sources 22. The polygons with their color values are then transmitted to a rasterizer 24.

For each polygon, rasterizer 24 determines which pixel positions are covered by the polygon and attempts to write the associated color values and depth (Z value) into frame buffer 26. Rasterizer 24 compares the depth values (Z) for the polygon being processed with the depth value of a pixel which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, video controller 28 displays the contents of frame buffer 26 on a display 30 a scan line at a time in raster order.

The viewing area 32 which a user may select with user input 16 is shown in FIG. 2. A front viewing plane 34 basically shows the position of the display screen in the three-dimensional space with a back plane 36 defining the back of the viewing volume. Front viewing plane 34 can be thought of as similar to the viewfinder on a camera which a user looks through as he walks around a scene trying to select the viewing angle he wants or moves forward to get a closer look. The clipping of a triangle 38 with viewing area 32 is shown. Triangle 38 represents one portion of the surface of an object in a three-dimensional scene which has a tip area 40 which extends into the viewing volume. When clipping is done, only this tip portion is retained and a new triangle is formed having a bottom edge corresponding to a line in the bottom plane of viewing area 32 which cuts through triangle 38. See, for instance, U.S. Pat. No. 3,816,126.

SUMMARY OF THE INVENTION

The present invention is a system for clipping polygons representing three-dimensional objects to produce a representation of the portion of the objects in a desired viewing space. A guardband space at least partially enclosing the viewing space is defined. The polygons are compared to the guardband space to determine which polygons intersect one of the guardband planes defining the guardband space. The intersecting polygons are also compared to the viewing space to determine if they intersect one of the viewing planes defining the viewing space. Only polygons intersecting both a viewing plane and a guardband plane are clipped.

Preferably, the polygons are triangles. Each triangle is compared against two defined volumes as shown in FIGS. 5 and 6. The first defined volume is the viewing area (volume), and if the triangle is completely outside the viewing volume it is simply discarded. The second defined volume is an area larger than the viewing volume which is separated from the viewing volume by a distance larger than the maximum dimension of an average triangle. All triangles completely inside this second volume are simply passed along to the next element of the graphic system without clipping. Only the remaining triangles, which extend through both the first and second defined volumes, are clipped. Thus, the number of triangles which must be clipped is drastically reduced since most triangles which protrude through the edge of the viewing volume are contained within the second defined volume.

An additional time savings is achieved by clipping triangles which only intersect one viewing plane only against that plane. Only triangles which intersect more than one viewing plane receive a full clip.

The result of this clipping is that triangles are then sent for processing for an area larger than the area intended to be viewed on the display screen. However, this simply means that some of the pixels which are later actually processed are not in fact displayed on the monitor and thus the processing is wasted. However, this processing time is a minor disadvantage compared to the processing time or hardware which would be required for full clipping. In addition, for the portion beyond the right side and beyond the bottom of the screen, processing can be avoided by simply stopping the triangle processors after a designated X and Y increment. For the portions corresponding to the top guardband, only single pixel wide lines need be rendered.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a prior art three-dimensional display processing system;

FIG. 2 is a diagram illustrating clipping according to the system of FIG. 1;

FIG. 3 is a block diagram of a three-dimensional graphics display processing system according to the present invention;

FIG. 4 is a diagram of a boundary area around a viewing area as used in the clipping system of the present invention;

FIG. 5 is a diagram illustrating in two-dimensional space which triangles are clipped according to the present invention; and FIG. 6 is a block diagram of the transformation and clipping logic of FIG. 3.

DETAILED DESCRIPTION OF THE PREFERRED EMBODIMENTS

FIG. 2 is a block diagram of a graphics display processing system according to the present invention. A host work station 42 is coupled to a display list DRAM 44 and a display list processor 46. Host work station 42 loads display lists into display list DRAM 44 and edits the display lists as desired. Display list processor 46 interprets the display list code and outputs primitives, structures and commands to transform and clip unit (XTC) 50. Optionally, a B-spline to polygon processor 48 may be inserted if the host work station and its display list is defined in terms of splines rather than polygons. Transform and clip circuit 50 transforms the triangle descriptions from model space to view space, then clips the triangles so that only the portion of triangles in the view area or the guardband area are passed along.

Triangle preparation and Y-sort circuit 52, in conjunction with Y buffer 54, sorts the triangles into scan line order. Each triangle is assigned to the scan line upon which it first appears. This circuitry keeps track of the number of triangles sent down the triangle pipeline as well as the number of triangle processors which are freed up in order to prevent an overflow condition. The triangle pipeline consists of a series of triangle processors 56 which are loaded with descriptions of particular triangles. The triangle processor then compares these descriptions to pixel positions as each scan line is traversed. The triangle processors output the proper value for each pixel to a normal vector shading circuit 58. This circuit provides the appropriate shading of the three-D picture in accordance with chosen angles of light, etc. The output of the normal vector shader is provided to an RGB Z buffer 60 and from there to a CRT 62. A frame buffer controller 63 compares the contents of frame buffer 60 to a new pixel value from a second pass through the triangle processor pipeline after an overflow. RGB Z frame buffer 60 and controller 63 may optionally be eliminated since the data is provided scan line by scan line ready for display. However, provision must then be made to handle overflows and assure that the load time for the triangles does not exceed the line-to-line time of the CRT.

Much of the work prior to rasterization of polygonal primitives lies in the clipping of the polygons against the traditional viewing pyramid. Even if only a minority of all the polygons need to be clipped, without sufficient dedicated hardware resources, these few clips can slow down the overall throughput considerably.

The present invention reduces the number of polygons that need to be explicitly clipped to a much smaller percentage than the prior art, and streamlines the remaining clipping action as well.

The invention is based upon the observation that as the complexity of the 3-D objects modeled goes up, the average size of the polygonal primitives out of which the object is built goes down. This means that the vast majority of clipped polygons only impinge beyond the boundaries of the viewing pyramid by a relatively small amount. If one can afford the penalty of occasionally drawing a polygon outside the normal screen area, the following method can reduce the number of explicit clips:

(1) Set up two clipping pyramids: an inner and an outer. The inner corresponds to the traditional clipping volume, while the outer is sized such that a typical polygon that needs to be clipped against the inner pyramid will be completely inside the outer pyramid. (The hither and yon z clipping planes are not doubled.)

(2) Set up the polygon clip test to test each point of the polygon against all the planes of both clipping volumes.

(3) Sort the tested polygons into one of the following classes:
  (a) all vertices are completely outside one of the planes of the inner volume, implying that the polygon is trivially rejected, and may be thrown away;
  (b) all vertices are completely inside all of the planes of the outer volume, but at least one vertex is inside one plane of the inner volume, implying that the polygon is trivially accepted;
  (c) at least one vertex is inside one of the inner clipping planes, but with some vertices outside exactly one plane of the outer volume, implying that the polygon must be clipped, but need be clipped only against a single edge of the outer volume;
  (d) at least one vertex is inside one of the inner clipping planes, with some vertices outside more than one plane of the outer volume, e.g., either at least one vertex outside two of the outer volume planes, and/or different vertices outside different outer volume clipping planes, implying that a full general clip of the polygon against the outer clipping volume must be performed.

Thus, this system allows most of the clipping polygons to be performed by the rasterization hardware during pixel drawing, rather than clip a vertex based on a description of the polygon at an earlier stage. Furthermore, when explicit clipping needs to be done, the much more common and simpler to handle single plane clipping case has been explicitly broken out.

Transform and Clip Unit.

Transform and clip circuit (XTC) 50 of FIG. 3 performs its clipping operation by defining a guardband volume around a viewing volume as shown in FIG. 4. Viewing volume 76 is similar to viewing volume 32 shown in FIG. 2. A guardband volume 78 is constructed around viewing volume 76 such that guardband volume 78 is separated from volume 76 by a distance greater than the maximum dimension of an average triangle.

Clipping is then performed as illustrated in FIG. 5. FIG. 6 shows a portion 80 in two dimensions of viewing volume 76 and a portion 82 of guardband volume 78. Two tests are performed by the clipping logic. First, triangles are compared with areas 80 and 82 to determine whether they are inside area 82 or outside area 80. Triangles 84 and 86 are inside area 2, and accordingly are passed along the pipeline without another processing. Triangles 88, 90 and 92 are all outside of area 80 and accordingly are discarded as not being within viewing volume area 80. Triangle 94, which intersects both the boundaries of areas 80 and 82, is the only one of the triangles shown which must be clipped. This sorting routine thus largely reduces the number of triangles which must be clipped. Although all the data within area 82 must be processed later on, only the data within area 80 is actually shown on the monitor. This results in extra data being processed, but due to the use of pipelined triangle processors, the time disadvantage is small compared to the time or extra circuitry required for clipping. This tradeoff would not be as useful in prior art systems which could require a significant amount of time to process the additional data. In addition, cross-hatched portion 96 need not be processed since the processing can be stopped after a certain X coordinate and a certain Y coordinate.

When employing guardband clipping with a triangle pipe rasterization system, further savings are possible because explicit rasterization time need be paid for only about one-quarter of the pixels within the guardbands. Referring to FIG. 5, the rasterization areas are broken down into five regions.

A. The first region A corresponds to the first lines to be rasterized, but not displayed. Because the triangle processors keep no state generated on a particular line except that computed during the SOL (start of line) sequence, we may rasterize all of the lines in region A as one pixel wide lines. New triangles must still be loaded into the pipe if they first become active during this region, but they would have been loaded by the first line below region A anyway if a traditional clipping algorithm had been employed. Thus, the pixels in region A need not be computed, and only a minimum time overhead associated with the number of lines (and not the number of pixels in a line) need be paid to implement the guardband of region A.

B. The second region corresponds to the left guardband of the scan lines with valid pixels on them. Because of the need of the triangle processors to start their incremental interpolation of surface values from a common left edge (in this case the left edge of region B), all pixels in region B must be rasterized. The time penalty is equal to the number of extra pixels rasterized: the area of the left guardband.

C. The third region corresponds to the normal screen area of the image, and of course must be computed. The first parts of all lines in region C were started in region B.

D. The fourth region corresponds to the right guardband of the scan lines with valid pixels on them. Because the triangle processors need no state computed beyond their valid pixels on a particular line, the pixels of region D need never be computed. Rather, on each scan line, EOL (end of line command) is sent after the last pixel of region C. Thus, no time penalty of any kind is needed to clip away any pixels in region D.

E. The fifth region corresponds to the bottom guardband of the image, and due to the top to bottom nature of the triangle processors rasterization, these lines need never be computed at all. Rather, the frame processing terminates with the completion of the last line of processing of region C. Triangle processors with triangles extending down into region E will still be active at the end of the frame, but are easily cleared out by the impending global RESET command initiating the next frame.

FIG. 6 is a block diagram of the transform and clipping circuitry of block 50 of FIG. 3. One embodiment of the remainder of FIG. 3 is shown in copending system application Ser. No. 07/116,999, filed on Nov. 4, 1987.

Input stage 98 controls inputs from DLR 46. Transform stage 100 gathers points and normals and transforms them to homogeneous clip space. View clip logic 102 tests points against view planes, clips and outputs points. Screen transform circuit 104 performs perspective divide and translation into screen space. Pick stack 106 maintains a stack of <obj id, tag>. Pick stack 106 also returns stack and surviving points (in screen space) and controls outputs to DLR 46 for diagnostics. Model clip logic 108 tests points against 6 half-spaces, sectioning support logic, and also provides pick support.

Transformation stage 100 outputs the transformed points and normals along with the mode/material register.

The hardware for the transformation stage consists of: input FIFOs, to buffer the input data until needed; three WTL3332 FPUs, two for point transform, one for normal transform; an unpacking mechanism for the normals; a simple sequencer; and assorted combinational logic to handle register loads.

View clip 102 tests triangle/vector points for clipping against the view volume. The results of the test are gathered and passed to floating point hardware to perform the clip if required.

The view clip test implemented takes advantage of the structure of the triangle processor pipe and tests for trivial accept/reject in such a way as to reduce actual view clipping requirements to an almost non-existent level. This involves building a "guard band" around the view cube that is larger than the average triangle, trivially accepting all triangles within the outer cube, and trivially rejecting all triangles outside the inner cube (trivial reject overrides in the case of a triangle that lands within the band). In this way only those triangles that straddle both cubes need to be clipped.

The end result is that the view clip test takes place against 10 planes, with trivial accept occurring within 6, and trivial reject occurring outside of 6 planes (the z planes are not doubled). In addition, because of the dual nature of the triangle processor pipe employed by the system, there are 3 planes at the center of the view volume defining the center point of the window. These planes will compose the guardbands for the left pipe end of scan and the right pipe start of scan.

In the case of a triangle that falls across the center of the screen, the center guardbands will be used to determine which pipe the triangle belongs to. If a triangle straddles the center line, then the strip/star is broken, a new one begun, with the result that a triangle that does straddle the center line will be generated twice, once for each pipe.

Note that triangle data into this stage is still in strip/star form. If a triangle needs to be clipped, the clip logic will "break" the strip and will output the clipped polygon as a new strip, consisting of either 3 or four points. The view clip will be against the outermost planes, and the ability to provide triangles divided by the center plane for the dual triangle processor pipe is essential. Strip/star data is flagged at this stage to indicate which of the two triangle pipes, left or right, it is directed to.

The goal for the clip is to be able to provide the three or four points for the clipped triangles at not more than 12 cycles per point if clip takes place against only one plane. Multiplane clips will take longer.

View clip 102 consists of two WTL3332's to perform the clip test, and logic to direct clipping properly. The clip logic itself consists of a 2901/2910 type machine, including a small, 1K–2K, writeable control store and a small scratch pad RAM for stacking triangles. This machine uses floating point hardware consisting of two Weitek 3332's, and a BIT B2110 FMPY unit (for the division).

Returning to view clip logic 102 of FIG. 7, the view clip logic reads in points from transform stage 100 and tests the points against the inner clip planes, the outer guardbands, the center planes and any (optional) sectioning planes. If a clip is required, the points and normals are passed into the actual clip hardware for clipping.

The clip test logic hardware consists of two WTL3332's, with the sign gather logic implemented in PLAs and controlled by the microcode. In addition there is a block of combinational logic to test the results of each point for trivial accept/reject purposes. If a triangle requires clipping, the sign bits are used to determine which plane to clip to. The two register files are used to hold the points as the strip/star or vector makes its way through the clip logic. The clip logic itself consists of a small local RAM (for the triangle stack) two WTL3332's and a BIT B2110 FMPY unit. There are two sequencers running this stage, one for the clip test logic, and another for the clip logic.

The clip test logic will read in w, multiply it by the guardband constants: Gx, Gy and gx=Gx−1.0. The remaining point components are tested against these values using the signs of the following operations:

w−x—Inner right plane
w+x—Inner left plane
Gxw−x—Outer right plane
Gxw+x—Outer left plane
gxw−x—Right of center outer plane, used by left pipe
gxw+x—Left of center outer plane, used by right pipe
x−0—Center plane
w−y—Inner top plane
w+y—Inner bottom plane
Gyw−y—Outer top plane
Gyw+y—Outer bottom plane
w+z—Fore plane
w−z—Aft plane The sign of each of these operations is latched and assembled into three 6 bit values, plus a center screen value, by combinational logic. These values will be decoded as follows:

Reject—These six bits (Right, Left, Top, Bottom, Fore, Aft) are set by the sign bit of the inner plane tests. If all points of a triangle are outside the inner planes the triangle is trivially rejected. This is determined by ANDing each of the three reject words together, and ORing the bits together. If this value is one then the three points are all outside of one plane.

Accept—These six bits (Right, Left, Top, Bottom, Fore, Aft) are set by the sign bit of the outer plane tests. If all points of a triangle are inside the outer planes AND not rejected, the the triangle is accepted. These bits are all ORed together and if 0 then the triangle is inside. If a 1, and NOT rejected, then the triangle must be clipped.

Center—These bits (Right/Left, CenterLeft, CenterRight) are used to determine which pipe a triangle is directed at. The R/L bit is simply the sign of x, if 0 then Right, if 1 then Left. The CL and CR bits are used to determine if a triangle is in the center guardbands regions. If in the center guard band, then the triangle strip is broken at this point and a new one is begun. These bits will also determine if a triangle straddles the center region and needs to be clipped.

All of these tests take place in combinational logic. The output of this logic will cause a triangle to passed on, rejected, or clipped.

The pick mode is tested and if in Pick Outline mode, no further action is taken. Any triangle or vector that is not trivially rejected is passed on. If in Pick Pixel mode, then the clip takes place, in order to provide the z value at the designated pixel.

If a triangle needs to be clipped it is clipped against the outer planes. The clip calculations use the parametric equations for a line to determine the intersection of relative edges and one of the clip planes. The parametric equations are of the form: p=p1+(p2−p1)t. Solving for t is done using the known value for x, y, or z, this value being the clip plane. For example, to clip against the right plane, x=Gxw, therefore t=(Gxw−x1)/(x2−x1). Having calculated t, solving for y, z, w, Nx, Ny, and Nz is a matter of solving the parametric equations for each. This is always done for two edges of the triangle, with the output being either 3 or 4 points. If the test determines that it is necessary to clip against more than one plane the three or four points are pushed onto a stack, and resubmitted to the clip logic.

This stage actually has a minimum 36 cycle latency per point, but will read/write a new point every 12 cycles for single plane or trivial accepted cases. The value of the CW/CCW bit is toggled at this stage, and the right/left bit is set here.

In the case of a triangle that falls across the center of the screen, the center guardbands will be used to determine which pipe the triangle belongs to. If a triangle straddles the center line, but does not straddle either guardband, then the strip/star is broken, a new one begun, with the result that a triangle that does straddle the center line will be generated twice, once for each pipe. A triangle that straddles both the center line and one or both guardbands will be clipped to the outer guardband for each half of the screen and all points output.

The clip test logic executes the operations described above, without saving the results. The clip logic will execute the following calculations, assuming a clip against the right plane:

x=Gx*w
t=(x−x1)/(x2−x1)
y=y1+(y2−y1)t
z=z1+(z2−z1)t
w=w1+(w2−w1)t
Nx=Nx1+(Nx2−Nx1)t
Ny=Ny1+(Ny2−Ny1)t
Nz=Nz1+(Nz2−Nz1)t

These calculations will take place for each of the two edges intersecting the clip plane.

There is only one command required for this stage:

XTC_GUARDBAND

This command loads the values of the various guard bands. The values are sent to the Y-buffer in pixels, but here the values must be in clip space. The three values loaded are Gx, the outer x guardband; Gy, the outer y guardband; and gx, the center guardband width. Note that gx=Gx−1.0.

As will be understood by those familiar with the art, the present invention may be embodied in other specific forms without departing from the spirit or essential characteristics thereof. For example, the guardband volume could be shaped differently.

A second, additional set of enclosing planes could be used outside the guardband to form an outer guardband. This outer guardband could be used to perform a first, rough cut, with fine tuning being done with the inner guardband. In addition, although the present invention has been described in connection with a triangle processor pipeline, it can be used with any type of rasterizing system. Accordingly, the disclosure of the preferred embodiment of the invention is intended to be illustrative, but not limiting, of the scope of invention which is set forth in the following claims.

What is claimed is:

1. A system for clipping polygons representing a three-dimensional objects to produce a representation of the objects in a viewing space defined by a plurality of viewing planes, comprising:
   means for determining coordinates of a guardband space defined by a plurality of guardband planes enclosing said viewing space on at least one side;
   means for comparing representations of said polygons to said coordinates of said guardband space to determine which polygons intersect at least one of said guardband planes;
   means for comparing said representations of said polygons intersecting said guardband planes to coordinates of said viewing space to determine which polygons are two-space polygons which also intersect at least one of said viewing planes; and
   means for clipping by generating new representations for only polygons which intersect both at least one of said guardband planes and at least one of said viewing planes wherein said new representations exclude at least portions of said polygons outside said guardband space.

2. The system of claim 1 further comprising means for discarding representations of polygons totally outside said viewing space and means for outputting, without generating new representations, remaining representations of polygons totally inside said guardband space.

3. They system of claim 1 wherein one of said viewing space and said guardband space is designated as a clipping space and further comprising:
   means for determining which of said two space polygons are single plane polygons which intersect only one plane of said clipping space; and
   means for generating said new representations for said single plane polygons with only said one plane of said clipping space being used to form a new edge for said single plane polygons.

4. The system of claim 1 wherein said polygons are triangles.

5. The system of claim 1 wherein said guardband space is defined by four planes surrounding said viewing space except in front and in back of said viewing space.

6. The system of claim 1 further comprise means for sorting polygons into one of the following classes
   (a) all vertices are completely outside at least one of the planes of said viewing space,
   (b) all vertices are completely inside all of said guardband planes, but at least one vertex is completely inside said viewing space,
   (c) at least one vertex is completely inside said viewing space, but with some vertices outside exactly one of said guardband planes,
   (d) at least one vertex is completely inside said viewing space, with some vertices outside more than one of said guardband planes; and
   means for clipping polygons in said class (c) against only one of said viewing planes.

7. The system of claim 1 further comprising means for rasterizing pixels representing said image only up to an end of said viewing space.

8. The system of claim 1 further comprising
   means for rasterizing pixels representing said image; and
   means for incrementing scan lines without rasterizing all of the pixels in a scan line for scan lines outside said prior to said viewing space.

9. The system of claim 1 further comprising
   means for rasterizing pixels representing said image; and
   means for stopping said rasterizing for scan lines outside and beyond said viewing space.

10. A system for clipping polygons representing three-dimensional objects to produce a representation of the objects in a viewing space defined by a plurality of viewing planes, comprising:
   means for determining a guardband space defined by a plurality of guardband planes at least partially enclosing said viewing space;
   means for comparing said polygons to said guardband space to determine which polygons intersect at least one of said guardband planes;
   means for comparing said polygons intersecting said guardband planes to said viewing space to determine which polygonals are two-space polygons which also intersect at least one of said viewing planes;
   means for clipping by generating new representations for only polygons which intersect both at least one of said guardband planes and at least one of said viewing planes, wherein said new representations exclude at least portions of said polygons outside a clipping space, said clipping space being one of said viewing space and said guardband space;
   means for discarding polygons totally outside said viewing space and means for outputting without clipping remaining polygons totally inside said guardband space;
   means for determining which of said two space polygons are single plane polygons which intersect only one plane of said clipping space;
   means for clipping said single plane polygons with only said one plane of said clipping space;
   means for rasterizing pixels representing said image only up to an end of said viewing space;

means for incrementing scan lines without rasterizing all of the pixels in the scan line for scan lines outside and prior to said viewing space; and means for stopping said rasterizing for scan lines outside and beyond said viewing space.

11. A method for clipping polygons representing three-dimensional objects to produce a representation of the objects in a viewing space defined by a plurality of viewing planes, comprising the steps of:

determining coordinates of a guardband space defined by a plurality of guardband planes enclosing said viewing space on at least one side;

comparing representations of said polygons to said coordinates of said guardband space to determine which polygons intersect at least one of said guardband planes;

comparing said representations of said polygons intersecting said guardband planes to coordinates of said viewing space to determine which polygons also intersect at least one of said viewing planes; and clipping by generating new representations for only polygons which intersect both at least one of said guardband planes and at least one of said viewing planes wherein said new representations exclude at least portions of said polygons outside said guardband space.

12. A method of claim 11 further comprising the steps of discarding representations of polygons totally outside said viewing space and outputting, without generating new representations, remaining representations of polygons totally inside said guardband space.

13. The method of claim 11 wherein one of said viewing space and said guardband space is designated as a clipping space and further comprising the steps of:

determining which of said two space polygons are single plane polygons which intersect only one plane of said clipping space; and generating said new representations for said single plane polygons with only said one plane of said clipping space being used to form a new edge for said single plane polygons.

14. The method of claim 11 wherein said polygons are triangles.

15. The method of claim 11 further comprising the step of rasterizing pixels representing said image only up to an end of said viewing space.

16. The method of claim 11 further comprising the steps of rasterizing pixels representing said image and incrementing scan lines without rasterizing all of the pixels in a scan line for scan lines outside and prior to said viewing space.

17. The method of claim 11 further comprising the steps of rasterizing pixels representing said image and stopping said rasterizing for scan lines outside and beyond said viewing space.

18. A method for clipping polygons representing three-dimensional objects to produce a representation of the objects, in a viewing space defined by a plurality of viewing planes, comprising the steps of:

determining a guardband space defined by a plurality of guardband planes at least partially enclosing said viewing space;

comparing said polygons to said guardband space to determine which polygons intersect at least one of said guardband planes;

comparing said polygons intersecting said guardband planes to said viewing space to determine which polygons also intersect at least one of said viewing planes;

clipping by generating new representations for only polygons which intersect both at least one of said guardband planes and at least one of said viewing planes, wherein said new representations exclude at least portions of said polygons outside a clipping space, said clipping space being one of said viewing space and said guardband space;

discarding polygons totally outside said viewing space;

outputting without clipping remaining polygons totally inside said guardband space;

determining which of said two space polygons are single plane polygons which intersect only one plane of said clipping space; and clipping said single plane polygons with only said one plane of said clipping space.

19. A system for clipping polygons representing three-dimensional objects to produce a representation of the objects in a viewing space defined by a plurality of viewing planes, comprising:

a central processing unit programmed to produce, from an input of said viewing space, a representation of a guardband space defined by a plurality of guardband planes enclosing said viewing space on at least one side;

a memory coupled to receive said representation of a guardband space and a representation of said viewing space from said central processing unit;

comparison logic means for comparing representations of said polygons to said representation of a guardband space and said representation of said viewing space in said memory and producing a first comparison output only when a polygon intersects both one of said viewing planes and one of said guardband planes; and clipping logic means, coupled to said comparison logic means, for clipping, by generating new representations, said polygons only when said first comparison output is received for a particular polygon, said new representations excluding at least portions of said particular polygon outside said guardband space.

* * * * *